Patented Jan. 9, 1940

2,186,779

UNITED STATES PATENT OFFICE 2,186,779

METHOD OF RECOVERING GOLD FROM SAPROLITE GOLD ORES AND OTHER REFRACTORY SLOW SETTLING GOLD ORES

Bruce D. Crawford, Grass Valley, Calif., assignor to American Cyanamid Company, New York, N. Y., a corporation of Maine No Drawing. Application November 17, 1937, Serial No. 175,032

1 Claim. (Cl. 75—2)

This invention relates to the recovery of gold from clayey saprolite ores.

The saprolite ores, which cover a considerable area in the Piedmont region of the southern United States, contain large amounts of gold but this type of ore has hitherto not proven amenable to any of the ordinary methods of concentration used on precious metal ores. The ore is a claylike material which generally retains the structure of the rock from which it is derived. The extremely slimy material can not be treated by the ordinary processes of cyanidation or flotation because of the sliminess and any attempts to deslime the ore result in the loss of a large proportion of the gold. For this reason the saprolite gold ores, although known for the last forty years, have not been generally exploited for the recovery of gold.

According to the present invention, I have found that a process which has been applied to precious metal ores of a different character solves the problem of recovering gold from the saprolite ores with high efficiency. This procedure essentially consists in cyaniding, precipitating the gold with charcoal and then floating the auriferous charcoal to form a concentrate. Despite the fact that the gold in saprolite ore cannot be floated, apparently the auriferous charcoal is of such a nature that can be separated from the clay slimes of the ore by a simple flotation procedure. I do not know just what the reason is why the gold changes in its nature so that although not recoverable by flotation in the original ore, a high recovery is obtained in the form of auriferous charcoal. The present invention is therefore not limited to any particular theory of action of the process.

The invention is applicable to any carbon which gives efficient precipitation in cyanide treatment. I have found, however, that contrary to the published patent literature, ordinary high temperature pine charcoal gives as good and even better results than activated carbon. I have not determined why in the present process cheap pine charcoal or Australian charcoal give as good or better results than specially activated carbon which sells for many times their price. While the present invention is therefore not limited to the use of high temperature charcoal and in its broader aspects includes the use of activated carbon, in a more specific aspect, the extraordinary effectiveness of cheap high temperature charcoal in the present process is an important feature of the invention. Low temperature charcoal, for example, charcoal prepared at 800° F. does not appear to be effective and I therefore prefer to use high temperature charcoal produced at temperatures around 800° C. and higher. There is no sharp dividing line, however, and charcoal produced at slightly lower temperatures still exhibits considerable activity.

It is an advantage of the present invention that the charcoal, if it has lost its precipitating power, can be brought back by reheating, for example to about 1000° C. This is an important advantage as it permits the reuse of charcoal which has lost its effectiveness.

The charcoal may be added at the beginning of the cyanidation, during the cyanidation or at the end with little effect on the gold recovery. It is an advantage of the present invention that the point of addition of the charcoal is not at all critical.

The invention will be described in conjunction with the specific examples which are typical applications of the invention to typical saprolite ores. It should be understood that recovery will vary somewhat with different ores.

Example 1

A saprolite gold ore containing 0.065 oz. of gold per ton was crused and then cyanided for 20 hours in a solution containing crude calcium cyanide having 0.053% sodium cyanide equivalent and 0.110% calcium oxide equivalent. The pulp density was 25% by weight of solids. After cyanidation, the pulp was agitated for 15 minutes with 2 lbs./ton of pine charcoal prepared by heating in a crucible at 825° C. The auriferous charcoal was then recovered by floating the pulp in a Fagergren flotation machine using 0.1 lb./ton of a 50:50 mixture of sodium diethyl- and di-secondarybutyl- dithiophosphates, 0.5 lb. per ton cresylic acid and 0.5 lb./ton of pine oil. The metallurgical results are as follows:

|  | Percent weight | Oz./ton Au | Percent distribution Au |
|---|---|---|---|
| Original ore | 100.00 | 0.062 | 100.00 |
| Flotation concentrate | 7.824 | 0.740 | 93.77 |
| Flotation tailing | 92.176 | 0.0035 | 5.22 |
| Solution |  | 0.0001 | 1.01 |

Example 2

A saprolite ore containing 0.0998 oz. gold/ton was cyanided for 24 hours at a pulp density of 33% solids by weight, using a cyanide solution as described in Example 1. The pulp was then agitated for 15 minutes with 6 lbs./ton of pine charcoal and was then floated in a Fagergren machine using 0.3 lb./ton of kerosene and 0.32 lb./ton of a frother consisting of a mixture of paraffin alcohols of 7 to 10 carbon atoms and a saturated hydrocarbon which is sold by the American Cyanamid Company under the name of "Frother 40". The metallurgical results are as follows:

|  | Percent weight | Oz./ton Au | Percent distribution Au |
|---|---|---|---|
| Original ore | 100.00 | 0.0098 | 100.00 |
| Cleaned flotation concentrate | 1.816 | 4.6321 | 86.40 |
| Cleaner tail | 13.809 | 0.0200 | 2.84 |
| Rougher tail | 84.375 | 0.0070 | 6.07 |
| Waste solution of rougher flotation |  | 0.0007 | 3.90 |
| Waste solution of cleaner flotation |  | 0.0001 | 0.79 |

*Example 3*

A sample of saprolite ore was cyanided for 25 hours at a pulp density of 25% solids by weight, using a cyanide solution as described in Example 1. The cyanided pulp was then agitated for 15 minutes with 1.5 lbs./ton of charcoal which had been preheated to 1000° C. for one hour and allowed to cool in a loosely covered container. The pulp was then floated in a Fagergren machine with 0.45 lb./ton of kerosene and 0.19 lb./ton of the frother described in Example 2. The metallurgical results are as follows:

| Product | Percent weight | Oz./ton Au | Percent distribution Au |
|---|---|---|---|
| Feed | 100.00 | 0.0557 | 100.00 |
| Flotation concentrate |  | 2.8132 | 95.59 |
| Flotation tail |  | 0.0025 | 4.40 |
| Waste solution |  | 0.00005 | 0.01 |

It will be apparent that preheating the charcoal has a marked effect and preheated charcoal is more effective than charcoal which has not been preheated. Tests were made with the ore of Example 3 with different charcoals; namely, pine charcoal, prepared by heating to 825° C., Australian charcoal preheated to 1000° C., and activated carbon. The recoveries at 0.5 lb./ton of charcoal were in the 80's, being just under 85% for the Australian charcoal, 85% for activated carbon and about 87% for pine charcoal. At about 1 lb./ton of charcoal, the recoveries were about 97%, the preheated Australian charcoal showing slightly higher recoveries, the pine charcoal a little less and the activated carbon the least. The figures were 98.9% for preheated Australian charcoal, 97.79% for pine charcoal and 97.21% for activated carbon. It will be apparent that in spite of its activation the much more expensive activated charcoal was not better than cheap pine charcoal. In fact, the tests indicate that the three materials ran so close together that for all practical purposes they may be considered as having the same efficiency. It is evident, therefore, that in the present process, the charcoal is not behaving in the same way as in the cases where activated carbon has been said to give improved results. This is a peculiar situation in the present process and one, the reason for which I have not as yet been able to determine. It is, however, a great economic advantage of the present process because pine charcoal costs only about ⅙ as much as activated carbon.

In the claim, the expression "high temperature charcoal" will be used to cover charcoals which have been produced at temperatures of about 800° C. or higher. It should be understood that the expression will have no other meaning.

What I claim is:

A method of recovering gold from auriferous saprolite ores which comprises cyaniding a pulp of the ore, treating the cyanided pulp with charcoal which has been preheated to about 1000° C. and subjecting the mixture to a froth flotation process in the presence of a reagent favorable to the flotation of auriferous carbon.

BRUCE D. CRAWFORD.